United States Patent Office

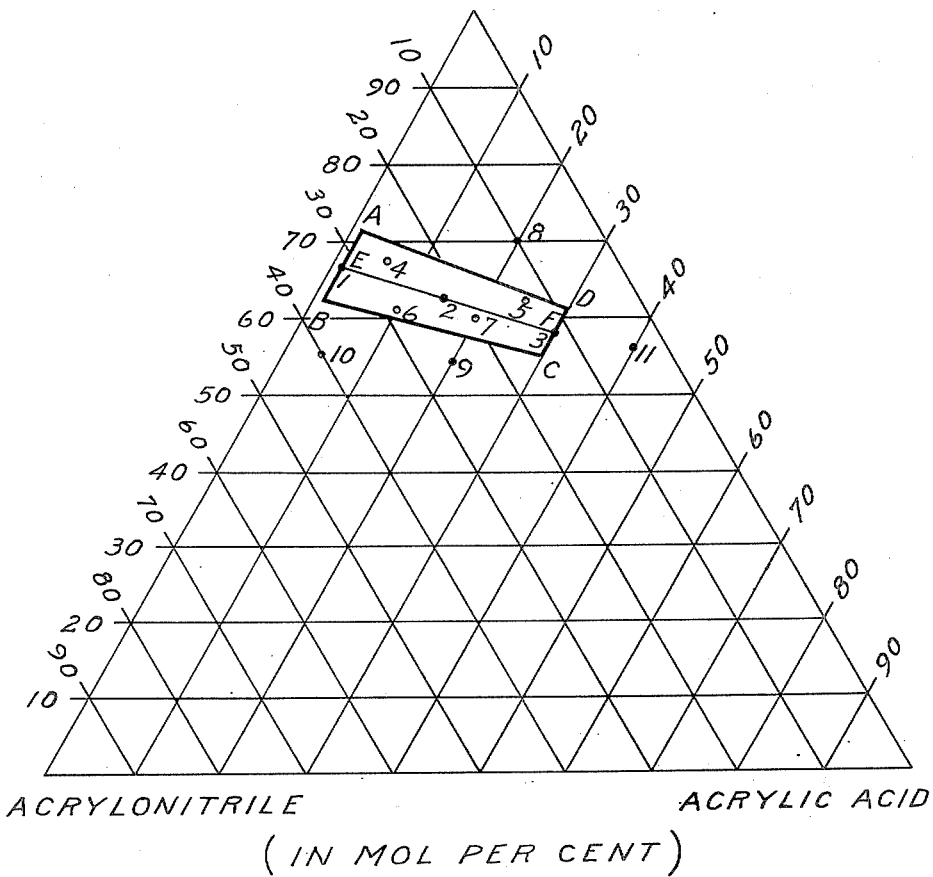
INVENTORS.
JOSEPH BRISKIN & EARL C. CHAPIN

2,772,252
TERPOLYMER SYSTEMS

Joseph Briskin and Earl C. Chapin, Springfield, Mass., assignors to Monsanto Chemical Company, St. Louis, Mo., a corporation of Delaware Application September 11, 1952, Serial No. 309,078

5 Claims. (Cl. 260—80.5)

This invention relates to thermoplastic resins. More particularly the invention relates to thermoplastic terpolymers of styrene, acrylic acid and acrylonitrile.

Polymers of styrene have many advantageous properties which permit their use in a wide variety of molded articles. One disadvantage of these polymers has been a heat distortion point of less than 100° C. For this reason, articles molded from styrene polymers soften and frequently turn white when subjected to boiling water in normal washing and sterilizing procedures.

One object of this invention is to provide thermoplastic molding powders based on styrene.

A further object is to provide modified thermoplastic molding powders having a heat distortion point above 100° C.

Another object is to provide a terpolymer system based on styrene.

Still another object is to provide a homogeneous terpolymer system based on styrene.

These and other objects are attained by mass copolymerizing from 55 to 72 mol percent of styrene with from 1 to 30 mol percent of acrylic acid and from 9 to 37 mol percent of acrylonitrile in the relative proportions shown in the accompanying drawings which is a chart of the terpolymer systems expressed in the mol percent of each component.

The terpolymers of styrene, acrylonitrile and acrylic acid referred to in the table were prepared by mixing the monomers in the proportions desired in the finished product, adding about 0.2% of di-(tertiary butyl) peroxide to the monomeric mixture and heating the mixture in the substantial absence of oxygen at about 105° C. for about 24 hours. The mixture is nearly 100% polymerized by this procedure.

A large majority of the terpolymers so produced are heterogeneous white opaque materials. However, as shown in the accompanying drawing which is a chart of terpolymeric systems expressed in mol percent of each component, there is a small well defined area ABCD in which the terpolymers are so nearly homogeneous that they are substantially clear and there is an even more sharply defined and restricted area, line EF, in which the terpolymers are completely homogeneous and entirely free from haze.

As shown in the following table terpolymers within the area ABCD have a heat distortion temperature between 102 and 116° C. and impact strengths of about 0.4 ft. lbs. per inch of notch.

Table

| Terpolymer | Styrene, mol percent | Acrylonitrile, mol percent | Acrylic acid, mol percent | Heat distortion, °C. | Impact, ft. lbs/in. notch | Character |
|---|---|---|---|---|---|---|
| 1 | 67 | 32 | 1 | 102 | .408 | Clear. |
| 2 | 63 | 22 | 15 | 105 | .405 | Do. |
| 3 | 58 | 12 | 30 | 116 | .400 | Do. |
| 4 | 68 | 27 | 5 | 102 | .408 | Slight haze. |
| 5 | 62 | 13 | 25 | 112 | .400 | Do. |
| 6 | 61 | 29 | 10 | 105 | .402 | Do. |
| 7 | 60 | 20 | 20 | 115 | .400 | Do. |
| 8 | 70 | 10 | 20 | 95 | .410 | Opaque. |
| 9 | 55 | 25 | 20 | 120 | .390 | Do. |
| 10 | 55 | 40 | 5 | 105 | .390 | Do. |
| 11 | 55 | 5 | 40 | 125 | .400 | Clear, softens in water. |

The terpolymers described in the table are plotted on the accompanying chart. From the chart, it can be seen that terpolymers 1, 2 and 3 are on line EF, terpolymers 4, 5, 6, and 7 are within area ABCD but not on line EF and terpolymers 8, 9, 10, and 11 are outside of area ABCD.

All of the terpolymers 1–7 can be boiled in water without softening or turning white. Terpolymers 8–10 are opaque and heterogeneous. Terpolymer 11 is partially soluble in hot water and swells, softens and turns white in boiling water.

All of the terpolymers 1–11 are resistant to such solvents as gasoline and carbon tetrachloride which readily attack styrene homopolymers. The terpolymers 1–10 are resistant to cold alkali but terpolymer 11 is partially soluble in cold alkali.

The terpolymers of this invention are preferably prepared by mass polymerization at temperatures of 90–180° C. using peroxy catalyst. A particularly advantageous method is isothermal polymerization at or near 105° C. but a stepwise process starting at 90° C. and ending at 180° C. also gives excellent results.

After polymerization is complete, the terpolymers may be pulverized, compounded with conventional ingredients such as lubricants, dyes, pigments, fillers etc., and then molded into various shapes and sizes by conventional methods such as injection molding. The molded articles have a heat distortion point above 100° C. and a notched impact strength of about 0.4 ft. lbs./inch notch. They may be subjected to boiling water to sterilize them or wash them without softening or turning white. They are also resistant to hydrocarbons such as gasoline, liquid aliphatic hydrocarbons and toluene. They are also resistant to cold caustic.

It is obvious that variations may be made in the products and processes of this invention without departing from the spirit and scope thereof as defined in the appended claims.

What is claimed is:

1. A substantially clear, hydrocarbon-resistant, carbon tetrachloride-resistant and boiling-water-resistant terpolymer of 55 to 72 mol percent of styrene, 1 to 30 mol percent of acrylic acid and from 9 to 37 mol percent of acrylonitrile, said terpolymer having been prepared by a mass polymerization process in which the monomers are first mixed together in the proportions desired in the terpolymer and the mixture is then polymerized at 90 to 180° C. in the presence of peroxy catalysts and in the substantial absence of oxygen.

2. A clear, hydrocarbon-resistant, carbon tetrachloride-resistant and boiling-water-resistant terpolymer of 58 to 67 mol percent of styrene, 1 to 30 mol percent of acrylic acid and 12 to 32 mol percent of acrylonitrile, said terpolymer having been prepared by a mass polymerization process in which the monomers are first mixed together in the proportions desired in the terpolymer and the mixture is then polymerized at 90 to 180° C. in the presence of peroxy catalysts and in the substantial absence of oxygen.

3. A clear, hydrocarbon-resistant and boiling-water-resistant terpolymer of styrene, acrylic acid, and acrylonitrile, said terpolymer containing 58 mol percent styrene units, 30 mol percent acrylic acid units, and 12 mol percent acrylonitrile units, said terpolymer having been prepared by a mass polymerization process in which the monomers are first mixed together in the proportions desired in the terpolymer and the mixture is then polymerized at 105° C. in the presence of 0.2 percent ditertiary butyl peroxide and in the substantial absence of oxygen.

4. A clear, hydrocarbon-resistant and boiling-water-resistant terpolymer of styrene, acrylic acid, and acrylonitrile, said terpolymer containing 67 mol percent styrene units, 1 mol percent acrylic acid units, and 32 mol percent acrylonitrile units, said terpolymer having been prepared by a mass polymerization process in which the monomers are first mixed together in the proportions desired in the terpolymer and the mixture is then polymerized at 105° C. in the presence of 0.2% of ditertiary butyl peroxide and in the substantial absence of oxygen.

5. A clear, hydrocarbon-resistant and boiling-water-resistant terpolymer of styrene, acrylic acid, and acrylonitrile, said terpolymer containing 63 mol percent styrene units, 15 mol percent acrylic acid units, and 22 mol percent acrylonitrile units, said terpolymer having been prepared by a mass polymerization process in which the monomers are first mixed together in the proportions desired in the terpolymer and the mixture is then polymerized at 105° C. in the presence of 0.2% of ditertiary butyl peroxide and in the substantial absence of oxygen.

References Cited in the file of this patent

UNITED STATES PATENTS

| | | |
|---|---|---|
| 1,933,052 | Fikentscher et al. | Oct. 31, 1933 |
| 2,604,457 | Segall | July 22, 1952 |